United States Patent [19]

Shannon

[11] Patent Number: 5,524,419
[45] Date of Patent: Jun. 11, 1996

[54] METHOD AND APPARATUS FOR MOLDING CONTACT LENSES AND MAKING THEIR CONTAINER

[75] Inventor: John H. Shannon, Hamlin, N.Y.

[73] Assignee: Bausch & Lomb Incorporated, Rochester, N.Y.

[21] Appl. No.: 382,714

[22] Filed: Feb. 2, 1995

[51] Int. Cl.$^6$ ................................................ B29D 11/00
[52] U.S. Cl. ........................... 53/431; 53/122; 53/453; 53/561; 264/1.1; 264/2.5; 425/808
[58] Field of Search .......................... 53/561, 453, 559, 53/431, 423, 122, 428; 264/2.5, 2.6, 2.7, 1.1, 1.6; 425/519, 521, 520, 354, 808

[56] References Cited

U.S. PATENT DOCUMENTS

| | | | |
|---|---|---|---|
| 2,663,130 | 12/1953 | Donofrio | 53/122 X |
| 2,700,939 | 2/1955 | Liston | 53/122 |
| 4,129,628 | 12/1978 | Tamutus | 264/1 |
| 4,279,401 | 7/1981 | Ramirez et al. | 249/139 |
| 4,865,779 | 9/1989 | Ihn et al. | 264/1.1 |
| 4,944,899 | 7/1990 | Morland et al. | 264/1.4 |
| 5,036,971 | 8/1991 | Seden et al. | 53/431 X |
| 5,100,590 | 3/1992 | Ruhlin | 264/2.7 |
| 5,143,660 | 9/1992 | Hamilton et al. | 264/1.4 |
| 5,178,801 | 1/1993 | Shimizu et al. | 264/2.5 X |
| 5,271,875 | 12/1993 | Appleton et al. | 264/2.3 |
| 5,316,700 | 5/1994 | Soye et al. | 264/1.1 |

Primary Examiner—James F. Coan
Attorney, Agent, or Firm—Katherine McGuire

[57] ABSTRACT

An improved, automated method and apparatus for molding contact lenses generally comprises the steps of: (1) forming anterior and posterior mold cavities in longitudinally spaced relation in first and second webs of material, respectively; (2) dispensing a liquid, curable, lens material (e.g., monomer) in each anterior cavity of the first web; (3) aligning and bringing the posterior and anterior cavities into sequential, mating, centered engagement with each other; (4) curing the lens material captured between respective posterior and anterior molds; and (5) separating the webs to release the lenses cast therebetween. In an advantageous embodiment of the invention, the mold cavities are vacuum-formed in the respective webs, and packaging receptacles are formed in one or both of the webs used to mold the lenses.

28 Claims, 6 Drawing Sheets

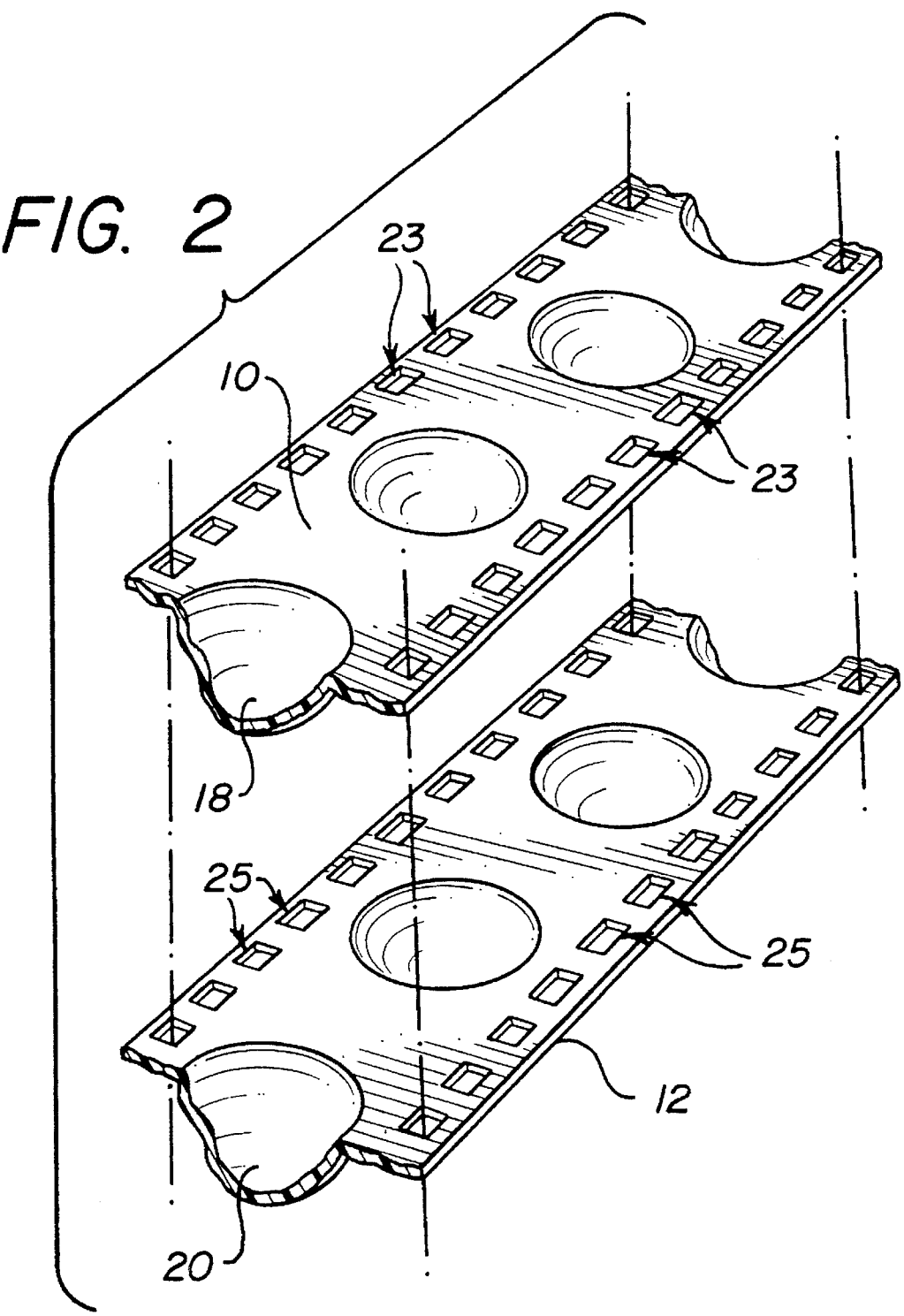

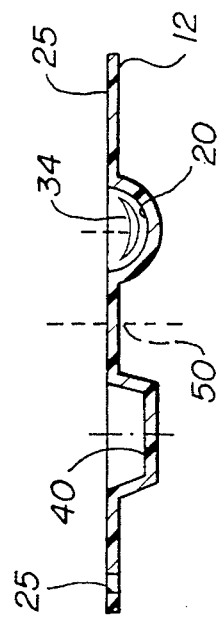
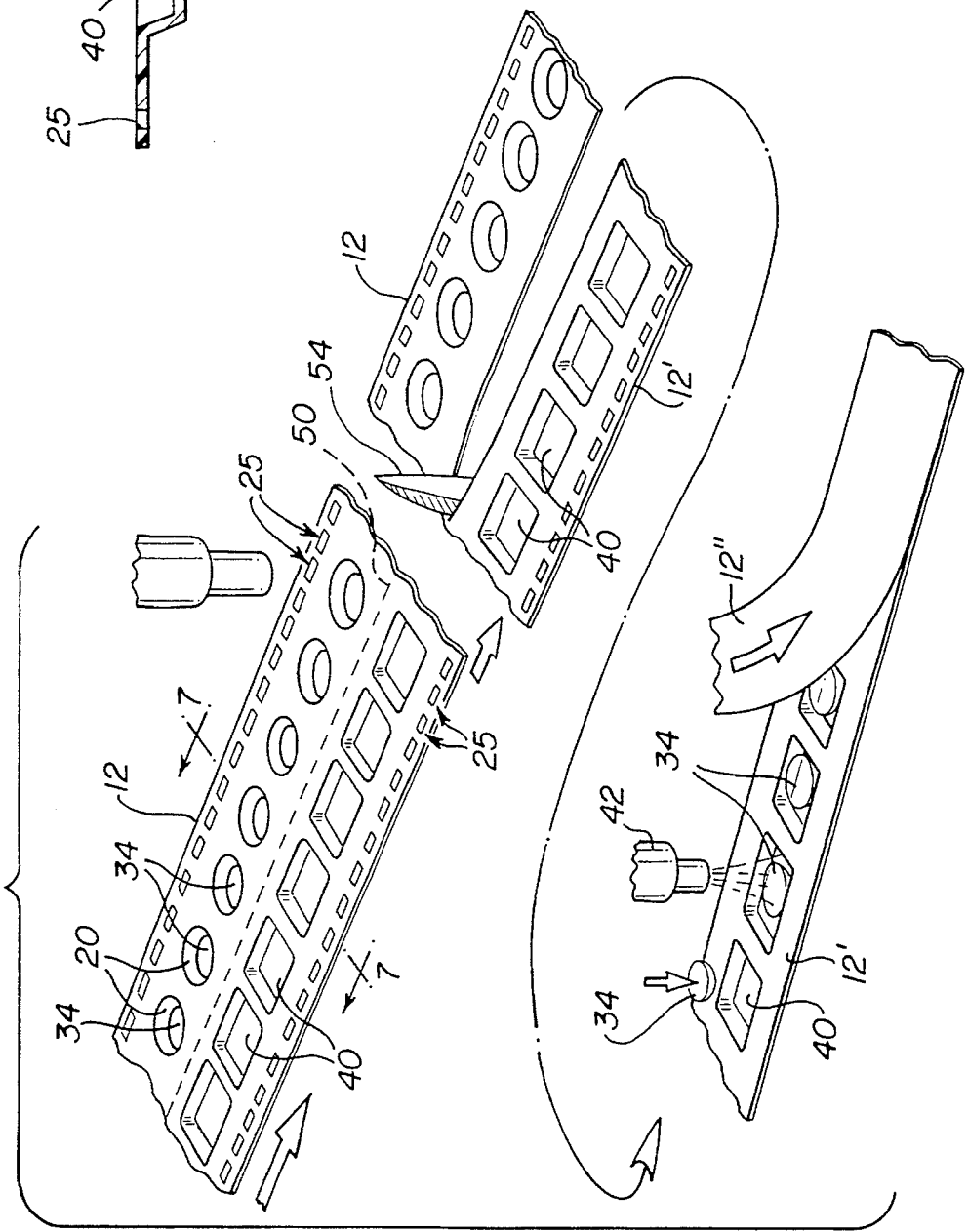

METHOD AND APPARATUS FOR MOLDING CONTACT LENSES AND MAKING THEIR CONTAINER

BACKGROUND OF THE INVENTION

1. Field of the Invention

The present invention pertains to a method and apparatus for molding lenses, and particularly to a method and apparatus for molding lenses such as contact lenses which have a finished edge and which are suitable for wearing directly on the eye. The invention more particularly pertains to a novel method and apparatus for molding contact lenses and making their containers which utilizes continuous web feeding methods wherein the lenses are molded between posterior and anterior mold cavities formed in first and second webs of material, respectively. The webs are brought together in aligned fashion by synchronized feeding mechanisms for curing of a liquid lens material previously disposed within one of the cavities, and thereafter separated from one another to expose the molded lenses. In an advantageous embodiment of the invention, packaging containers for the molded lenses are formed in the same web of material in which the lenses are molded.

2. Description of the Related Art

Cast molding of contact lenses has proven a reliable and economical method of high volume lens production. In this regard, manufacturing methods of molded lenses have seen increased emphasis on mold techniques which consistently produce non-reject lenses on a large production scale. Attention is directed to U.S. Pat. No. 5,271,875 which issued on Dec. 21, 1993 and is of common ownership with the present application, the '875 patent being incorporated herein by reference. The '875 patent relates to a method of molding a contact lens using anterior and posterior mold halves which are used only once by being brought together to mold the lens therebetween, separated following curing of the lens material, and then discarded. As described in the '875 patent, the mold halves include tapered side walls to form cooperating alignment means between the mold halves as they are brought together and clamped (see FIGS. 2–17 therein) or taper-locked (see FIGS. 21–24 therein) to provide the needed force to squeeze the mold halves together during polymerization. More particularly, deformable rim and annulus features 52 and 47 encircling the surface cavities of the anterior and posterior mold halves, respectively, are provided for engaging and deforming against one another during curing of the monomer contained in the mold by virtue of a clamping force applied to the mold halves. The juncture of the rim and annulus features forms the finished edge of the lens in addition to accommodating shrinkage of the lens material during curing thereof by slowly bringing the respective mold surface cavities toward one another as the rim and annulus features forcibly deform against one another.

While the method and apparatus of the '875 patent is effective at consistently producing substantial numbers of non-reject lenses on a large manufacturing basis, there remains a desire to continuously reduce costs through, for example, improved automation and packaging techniques.

SUMMARY OF THE INVENTION

The present invention addresses the desire to reduce manufacturing costs of molded lenses by providing an improved automated method for molding lenses between posterior and anterior mold cavities formed in longitudinally spaced relation on first and second, aligned webs of material which are continuously fed through the lens molding process. The lens molding process generally comprises the steps of: (1) forming the anterior and posterior mold cavities in the first and second webs, respectively; (2) dispensing a liquid, curable, contact lens material in the anterior mold surface; (3) bringing the two webs together with the posterior and anterior mold cavities in sequential mating alignment; (4) curing the liquid lens material to a solid state while accommodating for monomer shrinkage; and (5) separating the webs following the curing stage to retrieve the finished lenses. Ancillary process steps include lens inspection, hydration and packaging. In an advantageous embodiment of the invention, the lens packages are formed from the same webs of material used in the molding process.

The curable lens materials generally are composed of a curable mixture of polymerizable monomers. Curing results in copolymerization of the monomers to form a copolymeric shaped article. The curable lens materials include those known in the art for preparing hard or soft contact lenses. As known in the art, hard lenses include polymethylmethacrylate lenses and rigid gas permeable (RGP) lenses formed of a silicon or a fluorosilicone copolymer, and soft contact lenses include hydrophilic hydrogel lenses or silicone elastomer contact lenses.

The webs of material may be made from a variety of materials which are capable of having a plurality of spaced mold cavities formed therein. The mold cavities may be formed in each web by a primary vacuum-forming operation followed by a secondary coining operation. Alternatively, the mold cavities may be formed concurrently with the webs in a continuous-line injection molding process. Acceptable materials for either or both of the webs are the same as those listed in the '875 patent and include polyurethane, rigid polyvinyl chloride, ionomer, polyarylsulfone, polyetherimide, polyester, polystyrene, rubber modified copolymer or rigid polyurethane, all of which are amenable to either of the above web/mold-making processes.

The mold cavity profiles formed in the webs may be substantially identical to that shown and described in the '875 patent, or may have other profiles depending on the lens geometry desired. Also, various web feeding and mold centering means are described in detail below, although any method may be employed which feeds the anterior and posterior webs through the molding process in a fashion which aligns and centers the mold cavities in each web in mating engagement. This is accomplished with the individual mold halves of the '875 patent through the provision of telescoping side walls on the respective mold halves.

BRIEF DESCRIPTION OF THE DRAWINGS

FIG. 2 is a fragmented, perspective view of an embodiment of the anterior and posterior webs which include track-feeding perforations adjacent the opposite side edges thereof;

FIG. 6 is a fragmented, perspective view of an alternate lens packaging scheme; and FIG. 7 is a cross-sectional view of the composite web of FIG. 6 as taken through laterally adjacent receptacle and mold cavity portions thereof.

DETAILED DESCRIPTION OF THE PREFERRED EMBODIMENTS

Figure 1:
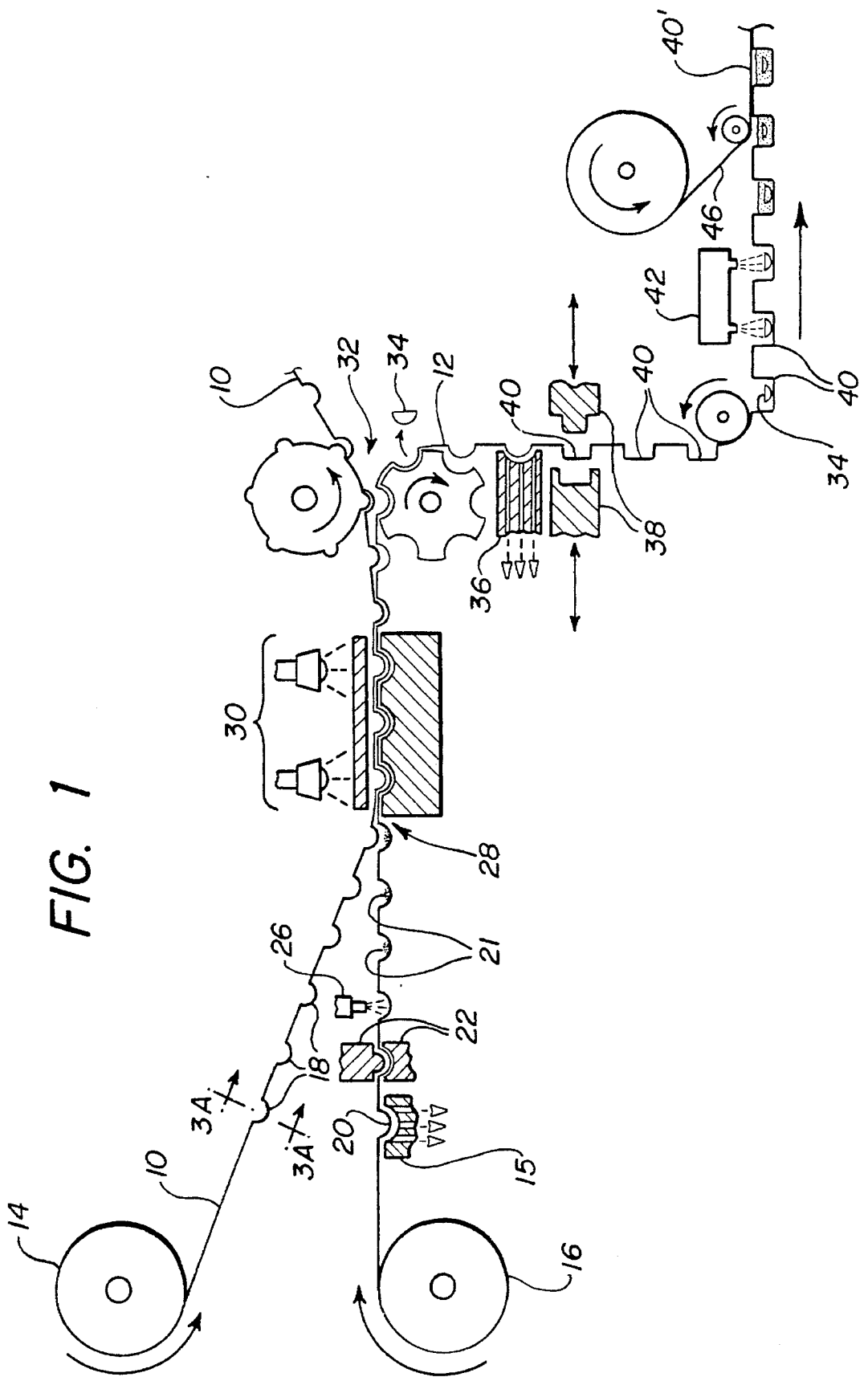
FIG. 1 is a simplified schematic representation of a first preferred method of carrying out the invention.
Figure 3A:
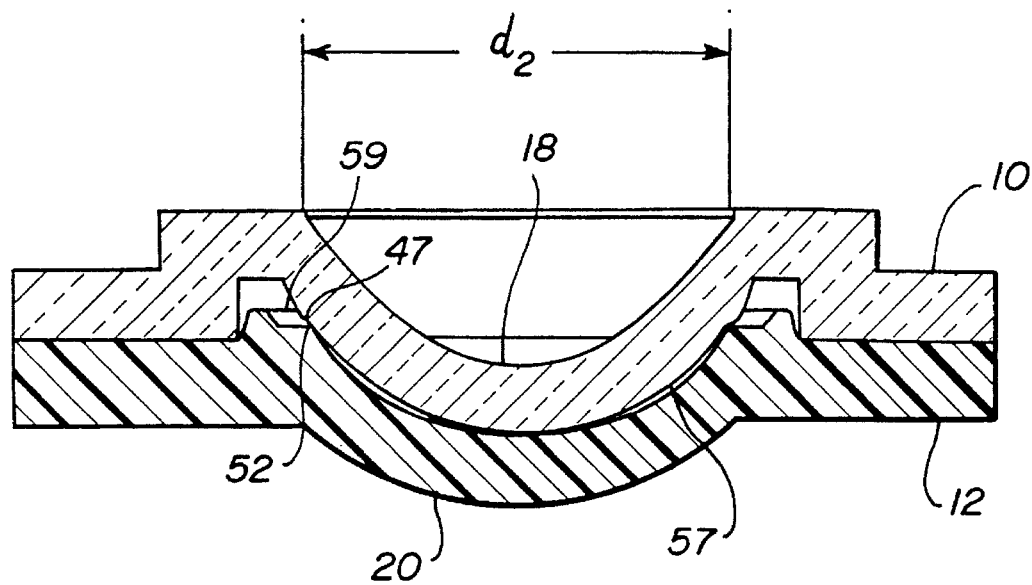
FIG. 3A is an enlarged, cross-sectional view as taken through the line 3A—3A in FIG. 1 of the fully mated anterior and posterior mold cavities to illustrate preferred mold cavity profiles thereof.

Referring now to the drawing, there is seen in FIG. 1 a simplified schematic representation of one preferred lens manufacturing and packaging process according to the present invention. Generally speaking, the process is carried out by providing first and second webs of material 10 and 12, respectively, which may advantageously be manufactured in rolls 14 and 16 from which webs 10 and 12 are simultaneously dispensed, respectively. Each web 10 and 12 is then individually subjected to a vacuum forming operation, such as at 15 on web 12, for forming the posterior and anterior mold cavities 18 and 20 therein, respectively. A secondary coining operation using hardened steel tools, such as at 22 on web 12, may additionally be performed on vacuum-formed cavities 18 and 20 to achieve the desired surface profiles. As aforementioned, these cavity profiles may be substantially identical to those profiles shown and described in the '875 patent, and which are reproduced in FIGS. 3A and 3B hereof. Thus, as in the '875 patent, rim and annulus features 52 and 47 may be formed in anterior and posterior mold cavities 20 and 18, respectively, which relatively deform against one another to form a finished lens edge while also accommodating for monomer shrinkage during the polymerization stage (described below).

Figure 3B:
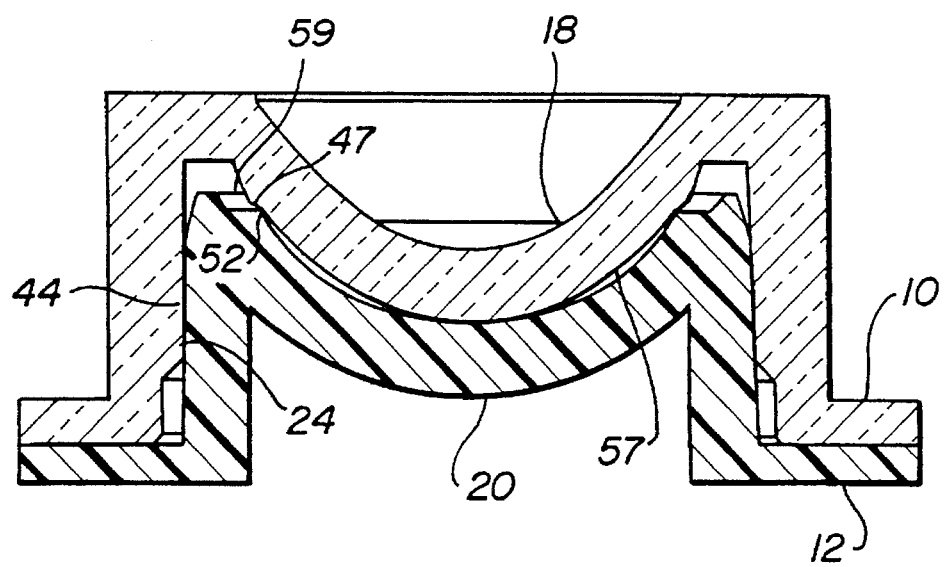
FIG. 3B is the view of FIG. 3A, yet illustrating additional mold cavity centering means in the form of telescoping side walls.

Additionally, while it is desirable, as in the '875 patent, to include a built-in receptacle 59 located radially outwardly adjacent the mating rim and annulus features for receiving and containing excess lens material therein, tapered side walls 24 and 44 may be optionally provided, as seen in FIG. 3B, depending on whether or not other mold centering means are provided, examples of which will be described later. If other mold centering means are provided, then the tapered side walls 24 and 44 would not be necessary.

It is noted that other methods of forming mold cavities 18 and 20 in webs 10 and 12 may be implemented. For example, cavities 18 and 20 may be formed simultaneously with webs 10 and 12 using a continuous-line injection molding process. Also, possible materials from which webs 10 and 12 may be made include those listed in the '875 patent as described above.

Following formation of the posterior and anterior mold cavities 18 and 20, respectively, a metered amount of liquid monomer 21 is dispensed, as at station 26, into each of the anterior mold cavities 20 formed in web 12. The posterior and anterior webs 10 and 12, respectively, are then brought together, as at 28, for molding and curing a lens between the mating mold cavities, as at 30.

Figure 4:
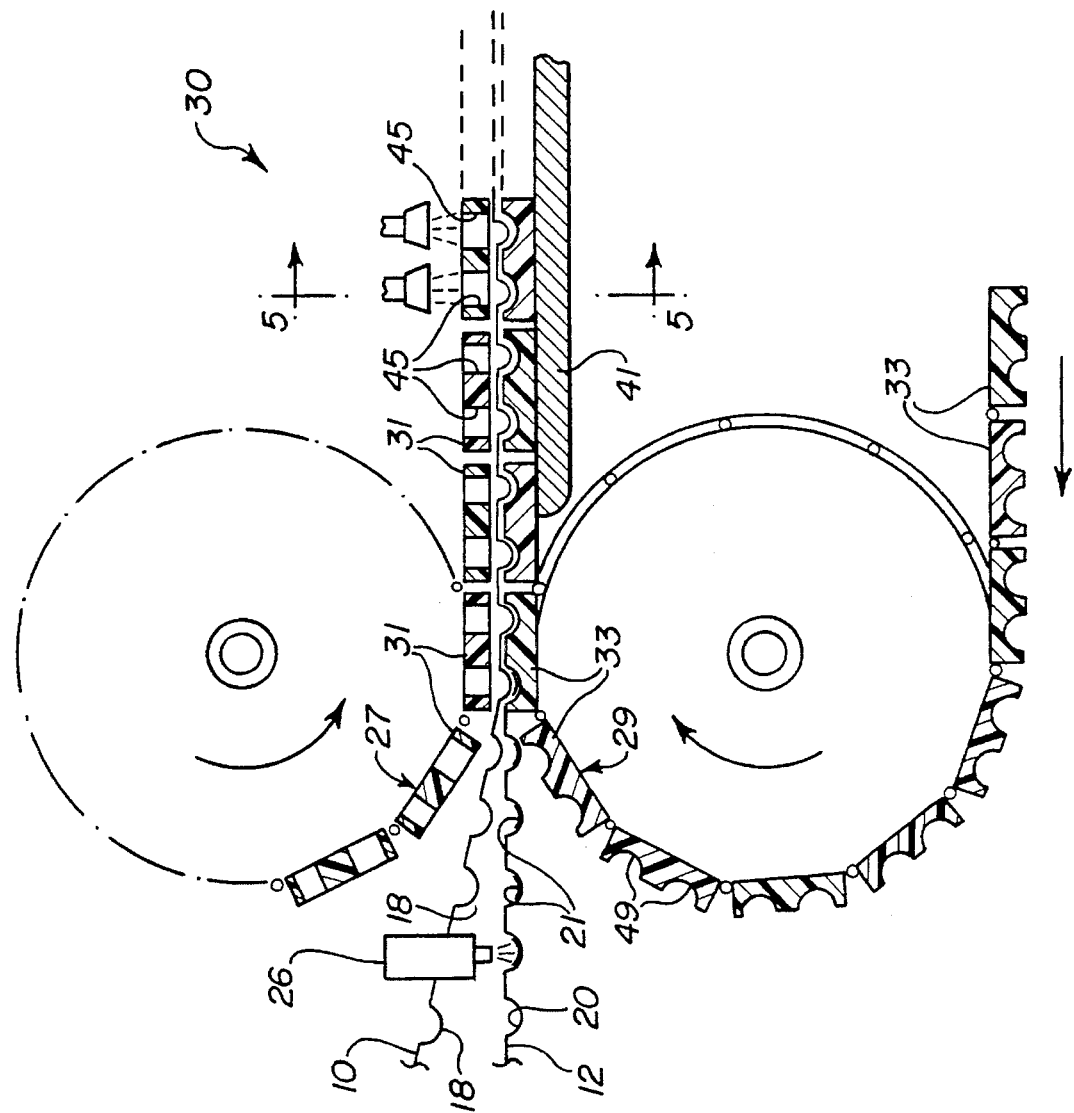
FIG. 4 is a cross-sectional, side elevational view of conveyor mechanisms which matingly feed and align the anterior and posterior webs through a molding and polymerization station.

It is of course necessary that the posterior and anterior webs 10 and 12 be brought together with their mold cavities 18 and 20 in precisely centered, mating engagement. In this regard, each web 10 and 12 may be carried by a conveyor belt 27 and 29, respectively (FIG. 4), which belts each comprise a plurality of pivotally linked, web support blocks 31 and 33, respectively, with blocks 33 having concave recesses 49 to support cavities 20, and blocks 31 having apertures 45 to pass UV light therethrough to cure the monomer 21. As seen, the travel of belts 27 and 29 are synchronized to carry webs 10 and 12 with mold cavities 18 and 20 in said centered, mating engagement.

While conveyor belts 27 and 29 may function to both feed and align webs 10 and 12, additional web feed/alignment means may be provided such as, for example, a track-feeding mechanism having rotating sprockets (not shown) which engage longitudinally spaced apertures 23 and 25 formed along the opposite side edges of each web 10 and 12, respectively (FIG. 2). Alternatively or additionally, each web 10 and 12 may be provided with the telescoping side walls 24 and 44, respectively, of FIG. 3B, which also serve as the centering means in the '875 patent as described above.

As described more fully in the '875 patent, it is necessary to accommodate for monomer shrinkage during the curing stage so as to deter the formation of bubbles, surface voids, and other imperfections in the cast lens. This is accomplished by applying pressure to the mated mold halves to slowly bring mold cavities 18 and 20 toward one another as the monomer disposed therebetween cures. In the cavity profiles of FIGS. 3A and 3B, this involves cold flow deformation of the rim 52 and annulus 47, and is accomplished with the separate mold halves of the '875 patent through the use of the clamping structure depicted in FIG. 11 thereof. With respect to the present invention, attention is turned to FIG. 5 which shows a load-applying roller assembly 35 which includes a pair of laterally spaced rollers 37 and 39 positioned to rotate in traversing relationship over and adjacent the opposite side edges 31' of belt 27 as belt 27 travels past assembly 35. Rollers 37 and 39 carry a load 39 which applies a downward force F of predetermined magnitude against the conveyor belt 27 adjacent the opposite side edges 31' thereof. A support platen 41 is also provided over which belt 29 travels with platen 41 acting to apply a reactive force $F_R$ to belt 29, with assembly 35 and platen 41 acting together so as to apply the needed clamping force to squeeze the mold cavities 18 and 20 together during the curing stage 30 of the monomer 21. As stated at col. 8 of the '875 patent, if the anterior and posterior mold cavities are formed of polypropylene and PVC, respectively, a clamping force of 20–40 pounds is preferred.

Figure 5:
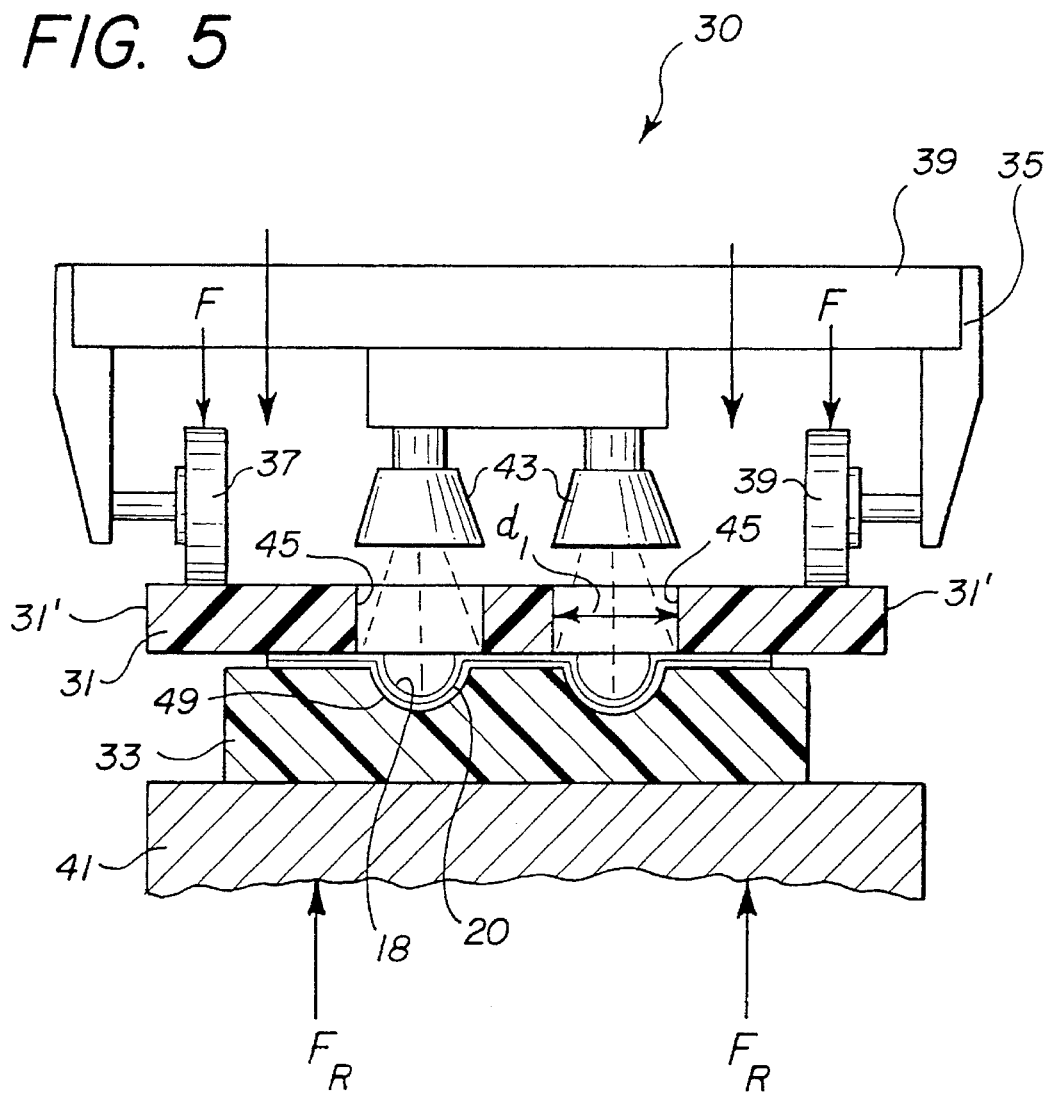
FIG. 5 is a cross-sectional, front elevational view of the molding and polymerization station as taken generally along the line 5—5 of FIG. 4.

In FIG. 5, curing is effected by a pair of UV lamps 43 which direct UV light through the longitudinally spaced apertures 45 formed in the support blocks 31 of belt 27, although other curing means (e.g., heat) may be used instead of or in addition to UV light. It is noted that webs 10 and 12 may include any number of laterally spaced rows of mold cavities 18 and 20, respectively, with support blocks 31 and 33 including a respective number of laterally spaced apertures 45 and concave recesses 49 to accommodate mold cavities 18 and 20, respectively.

Referring again to FIG. 1, after the monomer has cured at station 30, webs 10 and 12 are separated, as at 32, whereupon the cast lenses 34 are removed from their respective mold cavities by appropriate means. Although not shown, the cast lenses 34 may be further processed by way of final curing and inspection. Following the release of the cast lenses 34 from the mold cavities, web 12 (and/or web 10) is subjected to second vacuum-forming and coining operations, as at 36 and 38, respectively, wherein a plurality of lens receptacles 40 are formed for deposit of the cast lenses 34 therein. It is noted that the lens receptacles 40 are larger than the mold cavities 18 and 20 to accommodate for lens expansion during hydration, as at station 42, which follows the coining operation at 38. With the cast lenses 34 fully hydrated, an appropriate amount of lens preserving fluid (e.g., saline) is added to receptacles 40, and a web 46 of covering material (e.g., foil) is sealed to the perimeter of the receptacle opening which completes a package in which the lenses may be shipped, with or without further exterior packaging. A subsequent cutting operation (not shown) may be performed to separate the covered receptacles 40' as desired.

An alternate package forming scheme is shown in FIGS. 6 and 7 wherein receptacles 40 are formed in laterally spaced relation to mold cavities 20 in web 12. In this embodiment, a longitudinally extending perforating strip 50 may be formed between receptacles 40 and cavities 20 which may be subsequently torn or cut, as at 54 (or by other appropriate means), to form a separate receptacle strip 12'.

What is claimed is:

1. A method of molding a plurality of concavo-convex lenses comprising the steps of:
   a) forming anterior and posterior lens mold cavities in longitudinally spaced relation in first and second webs of material, respectively;
   b) depositing a metered amount of curable lens material in each of said anterior mold cavities;
   c) aligning and moving said first and second webs of material together with aligned anterior and posterior mold cavities thereof sequentially moving into centered, mating engagement with one another;
   d) curing the lens material and applying a clamping force to the formed, mated webs during curing; and
   e) separating said first and second webs to release each lens cast between mated anterior and posterior lens mold cavities.

2. The method of claim 1 and further comprising the steps of:
   f) forming a plurality of package receptacles in at least one of said first and second webs of material wherein said cast lens is placed for shipping; and
   g) applying a sealed cover over each of said receptacles.

3. The method of claim 2 wherein in step f), said package receptacles are formed over and replace at least one of said anterior and posterior mold cavities of said first and second webs, respectively.

4. The method of claim 2, and further comprising the step of dispensing a lens hydrating fluid in said receptacle prior to applying said sealed cover thereto.

5. The method of claim 1, wherein a vacuum forming mechanism is employed in step a).

6. The method of claim 5, wherein a coining mechanism is employed subsequent to said vacuum forming mechanism.

7. The method of claim 1 wherein said webs and lens mold cavities are simultaneously formed by an injection molding process.

8. The method of claim 2 wherein said receptacles are formed utilizing a vacuum forming mechanism.

9. A method of molding a plurality of concavo-convex lenses comprising the steps of:
   a) providing first and second webs of material;
   b) forming alignable anterior and posterior lens mold cavities in longitudinally spaced relation in said first and second webs of material, respectively;
   c) depositing a metered amount of curable lens material in each of said anterior mold cavities;
   d) aligning and moving said first and second webs of material together with aligned anterior and posterior mold cavities thereof sequentially moving into centered, mating engagement with one another;
   e) curing the lens material and moving said mating anterior and posterior mold cavities toward one another to accommodate for lens material shrinkage during curing; and
   f) separating said first and second webs to release each lens cast between mated anterior and posterior lens mold cavities.

10. The method of claim 9 wherein in step e), said mating anterior and posterior mold cavities are moved together with a clamping apparatus comprising a support platen and a weighted roller assembly, said first web being guided over said support platen with said weighted roller assembly applying a force F against said second web of material towards said first web of material with said support platen applying a simultaneous reactant force FR to said first web of material towards said second web of material thereby moving said mating anterior and posterior mold cavities toward one another.

11. The method of claim 10, wherein said first and second webs are moved together in step d) by first and second conveyor belts which engage and travel with said first and second webs of material, respectively.

12. The method of claim 11 wherein said anterior mold cavities each include an exterior surface opposite to said mating posterior cavities, and wherein said first conveyor belt includes rigid portions which are aligned and reversely contoured with respect to said exterior surfaces of said anterior mold cavities, each of said rigid portions supporting a respective said anterior mold cavity as said first web of material travels with said first conveyor belt.

13. The method of claim 12 wherein said reactant force FR is applied to said mated, formed webs of material through said rigid portions of said first conveyor belt.

14. The method of claim 11 wherein said first conveyor belt comprises a plurality of pivotally connected support blocks each having at least one concave recess, said recesses being aligned with said anterior mold cavities, said anterior mold cavities being positioned in and supported by a respective said concave recess as said first web of material travels with said first conveyor belt.

15. The method of claim 11 wherein said second conveyor belt comprises a plurality of pivotally connected support blocks each having at least one aperture, said apertures being aligned with said posterior mold cavities as said second web of material travels with said second conveyor belt.

16. The method of claim 15 wherein the curing is directed through said apertures in said support blocks.

17. The method of claim 16 wherein said curing is effected by UV radiation.

18. Apparatus for molding a plurality of concavo-convex lenses, said apparatus comprising:
   a) anterior and posterior mold cavities formed in longitudinally spaced relation in first and second webs of material, respectively;
   b) means for dispensing a metered amount of curable lens material in each one of said anterior mold cavities in said first web of material;
   c) means for moving said first and second webs of material together with said anterior and posterior cavities aligning and sequentially engaging with each other in centered, mating fashion with said metered amount of curable lens material disposed therebetween;

d) means for curing said curable lens material disposed between said aligned, mating anterior and posterior lens cavities;

e) means for applying a clamping force on said mated, formed first and second webs of material; and f) means for separating said first and second webs of material to expose the lenses cast between each of said mating anterior and posterior lens cavities.

19. The apparatus of claim 18 wherein said clamping means is operable to move said mating anterior and posterior mold cavities toward one another.

20. The apparatus of claim 19, wherein said web moving means comprises first and second conveyor belts which carry said first and second webs of material, respectively.

21. The apparatus of claim 20 wherein said anterior mold cavities each include an exterior surface opposite to said mating posterior cavities, and wherein said first conveyor belt includes rigid portions which are aligned and reversely contoured with respect to said exterior surfaces of said anterior mold cavities, each of said rigid portions supporting a respective said anterior mold cavity as said first web of material is carried by said first conveyor belt.

22. The apparatus of claim 21 wherein a component of said clamping force is applied to said mated, formed webs of material through said rigid portions of said first conveyor belt.

23. The apparatus of claim 20 wherein said first conveyor belt comprises a plurality of pivotally connected support blocks each having at least one concave recess, said recesses being aligned with said anterior mold cavities whereby said anterior mold cavities are positioned in and supported by a respective said concave recess as said first web of material is carried by said first conveyor belt.

24. The apparatus of claim 20 wherein said second conveyor belt comprises a plurality of pivotally connected support blocks each having at least one aperture, said apertures being aligned with said posterior mold cavities as said second web of material is carried by said second conveyor belt.

25. The apparatus of claim 24 wherein curing means is directed through said apertures in said support blocks.

26. The apparatus of claim 25 wherein said curing means comprises UV radiation.

27. The apparatus of claim 18 wherein said clamping means comprises a support platen and a weighted roller assembly, said first conveyor belt being guided over said support platen, and said weighted roller assembly engaging portions of said second conveyor belt located opposite said second web of material, said weighted roller assembly being operable to apply a force F against said second web of material towards said first web of material with said support platen applying a simultaneous reactant force $F_R$ to said first web of material towards said second web of material thereby applying said clamping force to each of said mating anterior and posterior mold cavities as said first and second webs of material travel with said first and second conveyor belts, respectively.

28. The apparatus of claim 18 wherein said anterior and posterior mold cavities are vacuum formed in said first and second webs of material, respectively.

* * * * *